United States Patent
Steely, Jr. et al.

(10) Patent No.: US 8,301,844 B2
(45) Date of Patent: Oct. 30, 2012

(54) CONSISTENCY EVALUATION OF PROGRAM EXECUTION ACROSS AT LEAST ONE MEMORY BARRIER

(75) Inventors: Simon C. Steely, Jr., Hudson, NH (US); Gregory Edward Tierney, Chelmsford, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1602 days.

(21) Appl. No.: 10/756,534

(22) Filed: Jan. 13, 2004

(65) Prior Publication Data

US 2005/0154832 A1    Jul. 14, 2005

(51) Int. Cl.
G06F 13/38    (2006.01)

(52) U.S. Cl. ........ 711/144; 711/141; 711/142; 711/143; 711/145; 711/146

(58) Field of Classification Search .................. 711/141, 711/142, 143, 144, 145, 146
See application file for complete search history.

(56) References Cited

U.S. PATENT DOCUMENTS

| | | | |
|---|---|---|---|
| 5,197,132 A | 3/1993 | Steely, Jr. et al. | |
| 5,222,224 A | 6/1993 | Flynn et al. | |
| 5,404,483 A | 4/1995 | Stamm et al. | |
| 5,420,991 A * | 5/1995 | Konigsfeld et al. | 711/150 |
| 5,467,473 A * | 11/1995 | Kahle et al. | 712/23 |
| 5,491,811 A * | 2/1996 | Arimilli et al. | 711/144 |
| 5,519,841 A | 5/1996 | Sager et al. | |
| 5,625,829 A | 4/1997 | Gephardt et al. | |
| 5,651,125 A * | 7/1997 | Witt et al. | 712/218 |
| 5,721,855 A | 2/1998 | Hinton et al. | |
| 5,802,577 A | 9/1998 | Bhat et al. | |
| 5,829,040 A | 10/1998 | Son | |
| 5,845,101 A | 12/1998 | Johnson et al. | |
| 5,875,467 A | 2/1999 | Merchant | |
| 5,875,472 A | 2/1999 | Bauman et al. | |
| 5,937,431 A * | 8/1999 | Kong et al. | 711/145 |
| 5,958,019 A | 9/1999 | Hagersten et al. | |
| 6,032,231 A | 2/2000 | Gujral | |
| 6,055,605 A | 4/2000 | Sharma et al. | |
| 6,081,887 A | 6/2000 | Steely, Jr. et al. | |
| 6,085,263 A | 7/2000 | Sharma et al. | |
| 6,108,737 A | 8/2000 | Sharma et al. | |
| 6,134,646 A | 10/2000 | Feiste et al. | |
| 6,151,671 A | 11/2000 | D'Sa et al. | |
| 6,209,065 B1 | 3/2001 | Van Doren et al. | |
| 6,275,905 B1 * | 8/2001 | Keller et al. | 711/141 |
| 6,286,090 B1 | 9/2001 | Steely, Jr. et al. | |
| 6,301,654 B1 | 10/2001 | Ronchetti et al. | |
| 6,317,811 B1 | 11/2001 | Deshpande et al. | |
| 6,345,342 B1 | 2/2002 | Arimilli et al. | |
| 6,349,382 B1 | 2/2002 | Feiste et al. | |
| 6,356,918 B1 | 3/2002 | Chuang et al. | |

(Continued)

OTHER PUBLICATIONS

J. Handy, The Cache Memory Book. New York: Academic, 1998.*

(Continued)

*Primary Examiner* — Sanjiv Shah
*Assistant Examiner* — Samuel Dillon

(57) ABSTRACT

Multi-processor systems and methods are disclosed. One embodiment may comprise a multi-processor system including a processor that executes program instructions across at least one memory barrier. A request engine may provide an updated data fill corresponding to an invalid cache line. The invalid cache line may be associated with at least one executed load instruction. A load compare component may compare the invalid cache line to the updated data fill to evaluate the consistency of the at least one executed load instruction.

36 Claims, 6 Drawing Sheets

U.S. PATENT DOCUMENTS

| | | | |
|---|---|---|---|
| 6,408,363 | B1 | 6/2002 | Lesartre et al. |
| 6,412,067 | B1 | 6/2002 | Ramirez et al. |
| 6,457,101 | B1 | 9/2002 | Bauman et al. |
| 6,535,941 | B1 | 3/2003 | Kruse |
| 6,553,480 | B1 | 4/2003 | Cheong et al. |
| 6,574,712 | B1 | 6/2003 | Kahle et al. |
| 6,574,725 | B1* | 6/2003 | Kranich et al. ............ 712/31 |
| 6,591,348 | B1 | 7/2003 | Deshpande et al. |
| 6,594,821 | B1 | 7/2003 | Banning et al. |
| 6,615,343 | B1 | 9/2003 | Talcott et al. |
| 6,625,660 | B1* | 9/2003 | Guthrie et al. ............ 709/248 |
| 6,633,960 | B1 | 10/2003 | Kessler et al. |
| 6,633,970 | B1* | 10/2003 | Clift et al. ............ 712/217 |
| 6,651,143 | B2 | 11/2003 | Mounes-Toussi |
| 6,775,749 | B1* | 8/2004 | Mudgett et al. ............ 711/146 |
| 7,093,078 | B2* | 8/2006 | Kondo ............ 711/141 |
| 2001/0055277 | A1 | 12/2001 | Steely, Jr. et al. |
| 2002/0009095 | A1 | 1/2002 | Van Doren et al. |
| 2002/0099833 | A1 | 7/2002 | Steely, Jr. et al. |
| 2002/0099913 | A1 | 7/2002 | Steely, Jr. |
| 2002/0146022 | A1 | 10/2002 | Van Doren et al. |
| 2002/0194290 | A1 | 12/2002 | Steely, Jr. et al. |
| 2002/0194436 | A1 | 12/2002 | McKenney |
| 2002/0199067 | A1* | 12/2002 | Patel et al. ............ 711/145 |
| 2003/0069902 | A1 | 4/2003 | Narang et al. |
| 2003/0145136 | A1 | 7/2003 | Tierney et al. |
| 2003/0195939 | A1 | 10/2003 | Edirisooriya et al. |

OTHER PUBLICATIONS

M. Lipasti, C. Wilkerson, and J. Shen. Value locality and load value prediction. In Proceedings of the 7th ASPLOS, Boston, MA, Oct. 1996.*

Alexander, M. J., Bailey, M. W., Childers, B. R., Davidson, J. W., and Jinturkar, S., "Memory Bandwidth Optimizations for Wide-Bus Machines", Proceedings of the 25th Hawaii International Conference on System Sciences, Mauii, HA, Jan. 1993, pp. 466-475.*

Heriot-Watt University, "Data representation and number systems : Boolean logic : masks", Jun. 8, 2002, http://scholar.hw.ac.uk/site/computing/topic36.asp?outline=.*

Sato, T.; Ohno, K.; Nakashima, H. A mechanism for speculative memory accesses following synchronizing operations. Parallel and Distributed Processing Symposium, 2000. IPDPS 2000. Proceedings. 14th International.*

Rajiv Gupta. The Fuzzy Barrier: a mechanism for high speed synchronization of processors. Proceedings of the third international conference on Architectural support for programming languages and operating systems. Apr. 3-6, 1989.*

M. Cintra, J. F. Martnez, and J. Torrellas. Architectural support for scalable speculative parallelization in shared-memory multiprocessors. In Proceedings of the 27th Annual International Symposium on Computer Architecture, Jun. 2000.*

Kozyrakis, C.E. Vector IRAM: ISA and Micro-architecture. IEEE Computer Elements Workshop, Vail, CO, Jun. 21-24, 1998.*

Handy, Jim. The Cache Memory Book. Academic Press Inc. 1998. pp. 159.*

Vijaykumar et al. Speculative Versioning Cache. IEEE Transactions on parallel and distributed systems. vol. 12. No. 12. Dec. 2001.*

Gharachorloo, et al., "Memory Consistency and Event Ordering in Scalable Shared-Memory Multiprocessors", Computer Systems Laboratory, Stanford University, CA 94305, pp. 1-14.

Gharachorloo, et al., "Architecture and Design of AlphaServer GS320", pp. 1-16.

* cited by examiner

CONSISTENCY EVALUATION OF PROGRAM EXECUTION ACROSS AT LEAST ONE MEMORY BARRIER

CROSS REFERENCE TO RELATED APPLICATIONS

This application is related to the following commonly assigned co-pending patent applications entitled: "COHERENT SIGNAL IN A MULTI-PROCESSOR SYSTEM," application Ser. No. 10/756,636; "MULTI-PROCESSOR SYSTEMS AND METHODS FOR BACKUP FOR NON-COHERENT SPECULATIVE FILLS," application Ser. No. 10/756,637; "CACHE SYSTEMS AND METHODS FOR EMPLOYING SPECULATIVE FILLS," application Ser. No. 10/756,638; "REGISTER FILE SYSTEMS AND METHODS FOR EMPLOYING SPECULATIVE FILLS," application Ser. No. 10/756,644; "SYSTEMS AND METHODS FOR EXECUTING ACROSS AT LEAST ONE MEMORY BARRIER EMPLOYING SPECULATIVE FILLS," application Ser. No. 10/756,639; "MULTI-PROCESSOR SYSTEM UTILIZING SPECULATIVE SOURCE REQUESTS," application Ser. No. 10/756,640; "MULTI-PROCESSOR SYSTEM RECEIVING INPUT FROM A PRE-FETCH BUFFER," application Ser. No. 10/756,535; "SOURCE REQUEST ARBITRATION," application Ser. No. 10/755,919; "SYSTEMS AND METHODS FOR EMPLOYING SPECULATIVE FILLS," application Ser. No. 10/755,938, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

Multi-processor systems are also designed to assure memory consistency associated with memory reference operation ordering. Sequential memory consistency models require the memory reference operations of a process to appear to the rest of the system to execute in program order, even though much of the execution of the program can occur in parallel. The sequential consistency model imposes severe restrictions on the outstanding accesses that a process may have and effectively prohibits many hardware optimizations that could increase performance. A relaxed consistency model attempts to relax the constraints on the allowable event orderings, while still providing a reasonable programming model for the programmer. In a relaxed constancy model, an order is imposed between selected sets of memory reference operations, while other operations are considered unordered. One or more memory barrier or fences instructions are used to indicate the required order. However, no order is required between reference instructions that are not separated by a memory barrier or fence.

SUMMARY

One embodiment of the present invention may comprise a multi-processor system. The multi-processor system may comprise a processor that executes program instructions across at least one memory barrier. A request engine may provide an updated data fill corresponding to an invalid cache line. The invalid cache line may be associated with at least one executed load instruction. A load compare component may compare the invalid cache line to the updated data fill to evaluate the consistency of the at least one executed load instruction.

Another embodiment of the present invention may comprise a processor that evaluates the consistency of a load instruction in a program executed across at least one memory barrier. A request engine may provide an updated data fill corresponding to an invalid cache line. The invalid cache line may be associated with a load instruction. A load compare component may compare the invalid cache line to the updated data fill. A load access mask may operate in conjunction with the load compare component to evaluate the consistency of the load instruction.

Yet another embodiment of the present invention may comprise a processor system that evaluates the consistency of program execution across at least one memory barrier. The system may comprise means for executing program instructions across at least one memory barrier. The system may also comprise means for retrieving an updated data fill associated with an invalidated cache line corresponding to an executed load instruction. The system may further comprise means for comparing the invalidated cache line to the updated data fill to evaluate the consistency of the executed load instruction.

Still another embodiment of the invention may comprise a method of program execution in a multi-processor system. The method may comprise executing program instructions across at least one memory barrier. An invalidated cache line may be compared with an updated fill of the cache line corresponding to a load instruction to generate a load access mask. The consistency of a load instruction associated with the invalidated cache line may be evaluated based on the portion of the cache line retrieved by the load instruction and the load access mask.

DETAILED DESCRIPTION

This disclosure relates generally to systems and methods for processor speculation and backup in a multi-processor system. A source processor, in one embodiment, employs speculative execution of load instructions beyond an associated memory barrier to retrieve respective cache lines for the processor. One or more of the cache lines can be invalidated prior to the proper retirement of their associated load instructions. Updated data fills of the invalidated lines are retrieved by the processor. The invalidated cache lines are compared to their respective updated data fills. The portions of the cache lines retrieved by the load instructions are examined to determine if the load instruction has violated the memory consistency of the system.

Figure 1:
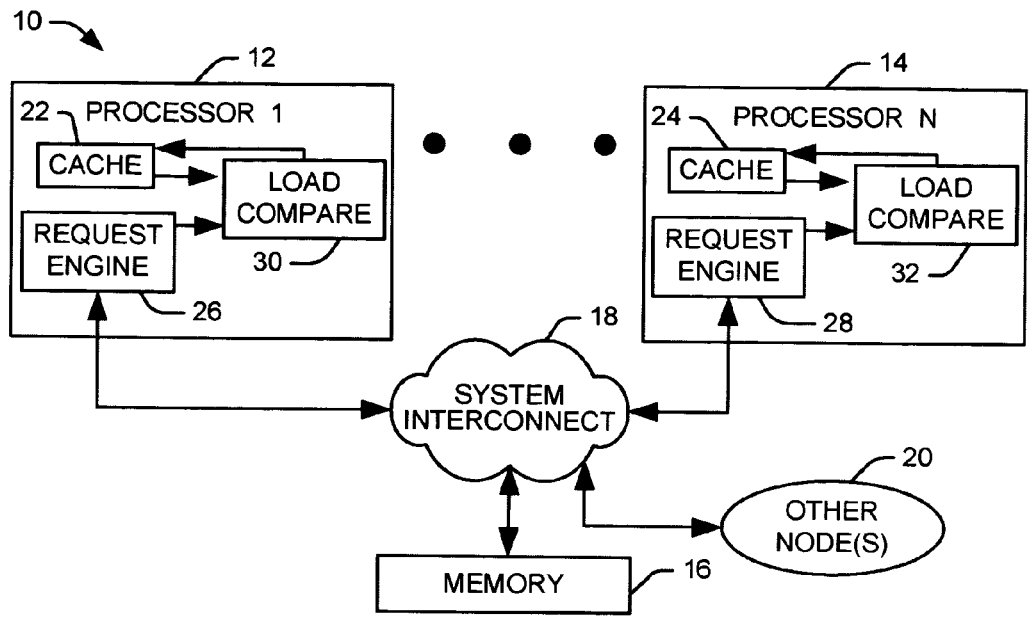
FIG. 1 depicts an example of a multiprocessor system.

FIG. 1 depicts an example of a system 10 that can employ speculative execution and instruction stream backup to mitigate processor latency. The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)).

The processors 12-14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12-14 includes at least one corresponding cache 22-24. For purposes of brevity, each of the respective caches 22-24 are depicted as unitary memory devices, although they may include a plurality of memory devices or different cache levels. Each of the caches 22-24 contains a plurality of cache lines. Each cache line has an associated address that identifies corresponding data stored in the line. The cache lines can also include information identifying the state of the data for the respective lines.

The system thus employs the caches 22-24 and the memory 16 to store blocks of data, referred to herein as "memory blocks" or "data fills". A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

A given processor 12 does not necessarily execute all of the instructions provided to it in a given order. For example, the order of execution of the instructions can be changed to reduce memory latency. A consistency model is used within the multiprocessor system to ensure that any deviations from the expected order at a given processor are not visible to other processors. Specifically, the consistency model ensures that out-of-order instructions at a processor are not observable to the operations of other processors and do not confuse the processor's observance of the order of operations at other processors.

One method of synchronizing multiple processors is the use of memory barriers. A memory barrier within a program prevents a processor from retiring program instructions beyond the barrier until all program instructions within the memory barrier have been executed. A set of instructions between two memory bathers is referred to as an epoch. For example, a memory barrier can be placed between instructions that set a series of values and a flag indicating the values have been set. Another processor reading the flag can accept the values with confidence, as the flag could not have been set without crossing the memory barrier, and this could not be accomplished without setting all of the values.

When a system includes processors executing instructions beyond a memory barrier prior to executing all instructions within the preceding epoch, it is a form of speculative execution. The speculative execution of instructions beyond memory barriers at a processor risks the possibility that the data received from other processors will become outdated, causing inconsistencies in the multiprocessor system. For example, another processor may have a write instruction to a particular cache line that is intended to be synchronized with a particular epoch at one processor. If the process executes beyond that epoch before this write is completed, load instructions in the next epoch may provide an incorrect value to the processor.

Processor latency can be lessened with speculative execution by allowing the processor to operate thousands of instructions ahead of the memory barrier in a period in which it would otherwise be latent. The validity of the instructions can later be verified by the system, and if no violation of the system consistency model is detected, the instruction can be retired. An instruction can be retired when all instructions from prior epochs have been executed and no significant change in the data used in the instruction has been detected.

One way in which a load instruction that violates the consistency of the system can be detected is the invalidation of the cache line retrieved by the instruction before the instruction can be retired. When a cache line is invalidated, it indicates that another process has altered the data within system memory (e.g., main memory 16 or another cache), such that the data within the cache line is no longer current. If this occurs prior to the retirement of a speculatively executed load instruction, it is possible that the change was a product of the prior epoch, and the value retrieved during the load instruction is now outdated. Any instructions executed after the outdated load instruction are also suspect, as they can be influenced by the faulty load. The processor 12 can include back-up registers, caches, and logs (not shown) that allow it to restore the system to an execution state associated with a given load instruction in the event that the instruction is found to have violated the consistency model of the system 10.

The invalidation of a cache line associated with a load instruction does not necessarily indicate an inconsistent instruction. For example, the portion of the cache line that was retrieved may not have been the same portion that was changed in the newer version of the cache line. It is also possible that the cache line was changed in succession to a new value and then back to the previous value. In either case, it would be unnecessary to back-up the system (e.g., restore the system to its state associated with the instruction) and lose the benefit of the processor activity after the invalidated load instruction.

The processors 12-14 contain respective request engines 26-28 that can retrieve an updated data fill of an invalidated cache line through the system interconnect 18. This updated data fill can be compared to the invalidated line at a load compare 30-32. The portions of the cache line involved in the load instruction can be examined to determine if the load instruction had retrieved inconsistent data.

This allows the consistency model of the system to be protected without unnecessarily disrupting otherwise valid speculative fills.

Figure 2:
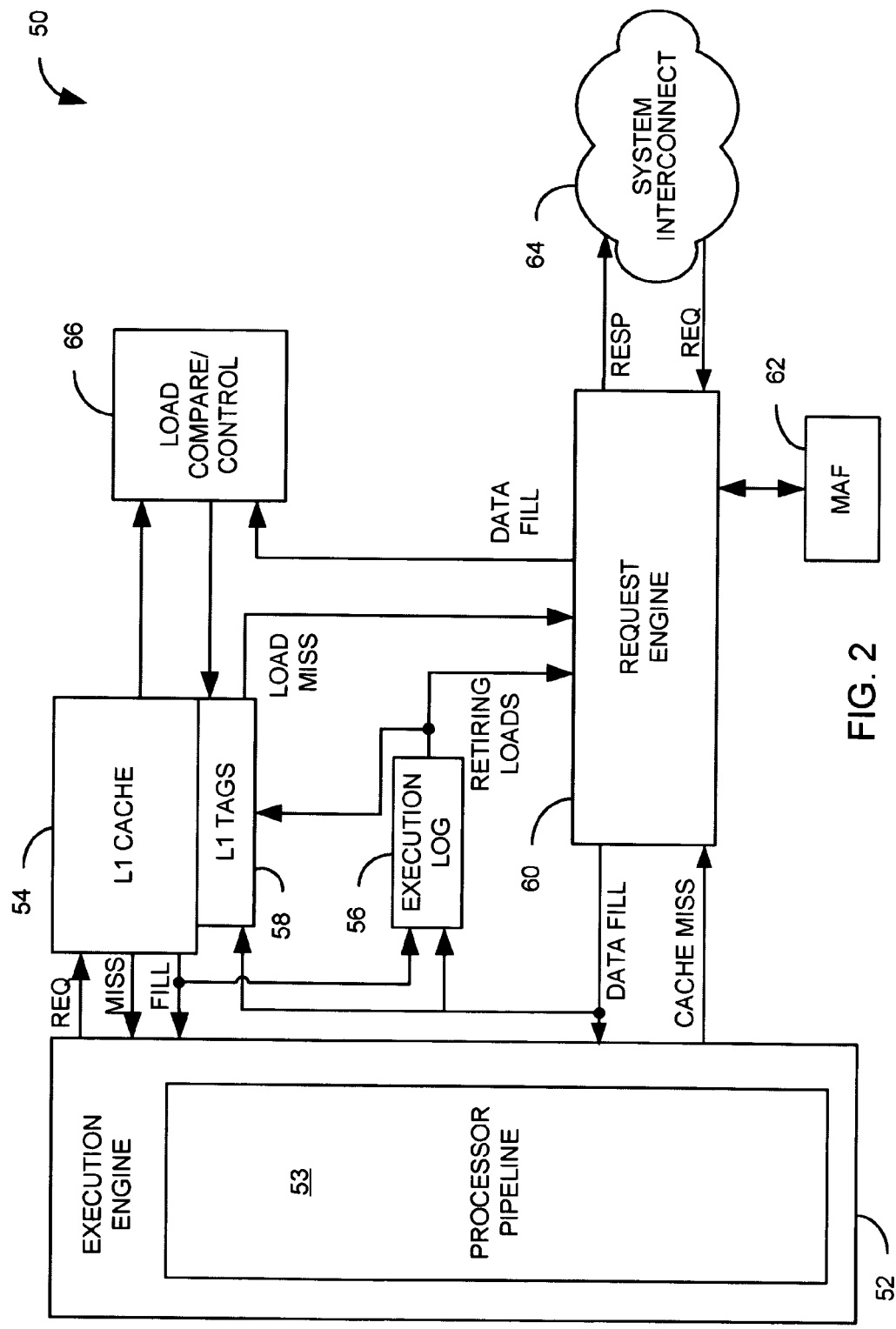
FIG. 2 depicts a processor associated with a multiprocessor system.

FIG. 2 illustrates a processor 50 associated with a multiprocessor system that speculatively executes load instructions beyond memory barriers associated with the system. For example, the processor 50 can comprise an out-of-order super-scalar processor that re-orders instructions within an epoch, or a long distance backup processor with support for speculative fill responses and a coherent signal. By bypassing memory barriers within the instruction stream, the processor 50 can speculatively execute several thousands of instructions ahead of a memory barrier prior to retiring all instructions within its associated epoch.

The system 50 includes an execution engine 52 that executes instructions associated with a processor pipeline 53. During a load instruction, the execution engine 52 searches a local cache 54 to determine if the cache line associated with the load instruction resides in the local cache 54. If the cache line resides in the local cache 54, the cache line is provided to the execution engine 52 for processing. The load is recorded at an execution log 56 as a log entry. A log entry comprises a field noting the entry as a load instruction (e.g., a read request), the address field accessed by the load instruction, and the address of the load instruction. Tag information for the requested cache line is also updated within cache tags 58 associated with the cache to reflect the load. For example, a pending load counter field associated with the cache line tag can be incremented.

The cache tags 58 can contain a number of fields. For example, a cache tag can include a field identifying the memory address of its associated cache line and a field giving the coherency state of the system. The contents of the coherency field are defined by the cache architecture and the cache coherency protocol of the system. A pending load counter field can also be included to monitor outstanding load entries in the log. The pending load counter can be incremented when a load entry corresponding to the cache line is added to the log and decremented when a load entry corresponding to the cache line is retired. The cache tags 58 can include additional fields according to the specific implementation of the system 50.

In the illustrated example, any cache line that has loads pending (e.g., loads that are recorded in the log) will not be displaced within the local cache 54 by a conflicting request with a different address. This is true even if the line has been invalidated by another processor within the system. A line that has been invalidated, but whose data remains in the cache, is referred to hereinafter as a resident invalid line. A resident invalid line can be identified using a dedicated state bit at the cache tags 58, or by a tag match with an invalid coherency state. In the later case, the address tags will be initialized to an unused value at system reset, and the address tags will be written during a fill response.

If the cache line does not reside in the local cache 54, the execution engine 52 initiates a cache miss to a request engine 60. The request engine 60 creates a missed address file (MAF) 62 entry and issues a source request to the system via a system interconnect 64. Each MAF entry is associated with a source request for a cache line. A MAF 62 can be implemented as a table, an array, a linked list or other data structure programmed to manage and track requests for each cache line.

The MAF entry includes fields that identify, for example, the address of the data being requested, the type of request, and response information received from other nodes in response to the request. The request engine 60 thus employs a MAF 62 having one or more MAF entries to manage requests issued by the request engine 60 as well as responses to such requests. A data fill for the cache line is provided to the request engine 60 in response to the source request in accordance with a system cache coherency protocol. The data fill is provided to the execution engine 52 for processing, and the load is recorded at the execution log 56.

In a first implementation, each cache tag 58 includes a load access mask field that is written as each load is executed in addition to the fields described above. The load access mask identifies one or more portions, or quanta, of the data within the cache line that are read in executing the load instruction. Each bit of the load access mask represents one quantum of the cache line data, indicating whether that quantum of data was part of the load instruction. For example, in a sixty-four byte cache line, a quantum size of eight bytes can be used. The load access mask can then be implemented as an eight-bit vector, with each bit representing an associated quantum. The cache tag can also include an inconsistent flag that can be set to indicate that the load instruction was executed in violation of the memory consistency model of the system.

The execution log 56 acts as a first-in-first-out (FIFO) queue, with each queue entry recording a load instruction. As each entry reaches the top of the queue, its associated load instruction becomes a candidate for retirement. It will be appreciated that a load instruction can be executed prior to the retirement of instructions in at least one previous epoch and may not itself become a candidate for retirement some time after is it executed. Accordingly, the cache line retrieved by the load instruction can be invalidated by another processor prior to its retirement. The execution log 56 allows the memory consistency of each load instruction to be evaluated before it is retired.

The load instruction can be in one of a plurality of associated states when it is considered for retirement. The state of the load instruction is determined by checking associated entries within the MAF 62 and the cache tags 58. Three of these states are pertinent to a discussion of a system employing speculative execution of load instructions, an authenticated state, an invalidate state, and an inconsistent state. In the authenticated state, the data that was retrieved by the load during execution has been authenticated by the processor. An entry in the authenticated state can be cleared from the log when it reaches the top of the queue. For example, a load instruction to a cache line whose associated cache tag indicates a valid state can be in an authenticated state.

An invalidate state indicates that the cache line associated with the load instruction has been invalidated by the system before it could be retired, but was retained as a resident invalid line. A load instruction in an invalidate state cannot be retired by the system. The resident invalid line is provided to a load compare component 66. A load miss is issued to the request engine 60 to obtain a valid fill of the cache line. When the fill is returned, it is provided to the load compare component 66, and to the cache 54 to replace the invalid cache line. The two fills of the cache line are compared, but only within the quanta utilized in the load instruction, as indicated by the load access mask associated with the cache line. If the fills are the same within these quanta, the load instruction has been authenticated and can be retired.

If the two fills differ within the quanta indicated by the load access mask, the load compare component 66 sets the inconsistent flag within the cache tag associated with the cache line to indicate that the load instruction is in an inconsistent state. If a load instruction is in an inconsistent state, the data retrieved in the load instruction has been overwritten by another processor in the system before it could be retired. This raises the possibility that the memory consistency of the system has been violated. To maintain memory consistency, the execution log 56 can be cleared and the instruction stream of the processor 50 can be backed up to the point of the inconsistent load. This can be accomplished, for example, through the use of cache and register backup structures (not shown) that provide back-up information relating to speculative executions within the processor.

In a second implementation, retiring loads are processed differently. Specifically, the load access mask is not written as new loads are entered into the log. Instead, the load access mask is written only for resident invalid cache lines as they are replaced by a valid fill from the request engine 60. When a cache line is invalidated by another processor within the system, a pending load counter field associated with the cache tag can be checked by the system. If the field contains a non-zero value, the cache line is maintained as a resident invalid cache line. Since it will be necessary to compare the invalidated line to a valid copy of the line when the pending load instructions to the line are considered for retirement, a miss request is provided to the request engine 60 to obtain a valid copy of the fill.

In the second implementation, the cache tags 58 also contain a last fill ticket number. When the fill is returned from the request engine, it is provided to the cache 54 to replace the invalid fill. A record of each fill, including a ticket value equal to the last fill ticket number field at the time of the fill, is stored in the execution log 56. The last fill ticket number increments with each fill retrieved from the system to the cache line to provide a unique ticket number for each fill entry. The valid fill is compared to the resident invalid cache line at the load compare 66, and a load access mask is written to indicate any changed values. The load access mask can be implemented as a vector of bits, with each bit representing a quantum of the cache line fill data. If any values within a given quantum have changed, then the corresponding bit in the load access mask is set.

When one of the pending load instructions to the cache line are ready for retirement (e.g., when its corresponding entry reaches the top of the execution log), it is determined from the execution log 56 which quanta were used during the load instruction. If a bit corresponding to one of these quanta is set in the load access mask, the load instruction is determined to be inconsistent. To maintain memory consistency, the execution log 56 can be cleared and the instruction stream of the processor 50 can be backed up to the point of the inconsistent load. This can be accomplished, for example, through the use of cache and register backup structures (not shown) that provide back-up information relating to speculative executions within the processor.

If none of the quanta used in the load instruction were changed, the load instruction can be retired. Once the fill has updated the data in the cache, a subsequent load instruction can use the new data value when it executes to mitigate consistency problems. To distinguish subsequent load instructions that use the new data from earlier instructions using the inconsistent data, log entries representing the fill responses are kept in order with the load instructions. When an entry representing a fill arrives at the end of the log 56, it is immediately retired. If the retired fill entry has a ticket value that matches the last fill ticket, then there are no additional fills to the cache line stored in the execution log 56. Accordingly, any subsequent load instructions would have used the current copy of the fill. The load access mask within the cache tag is cleared to reflect this upon the retirement of a fill having a ticket number matching the last fill ticket field.

It will be appreciated that the second implementation of the processor 50 allows multiple fills to be present in the log for the same cache line. However, the load access mask collects changes from each fill, so that each changed quantum across the fills is indicated. The final fill can clear the mask. Alternatively, a set of load access masks could be used, corresponding to different fill ticket values. In this system, to retire a load instruction, it would only be necessary to check changes from fills subsequent to the last retired fill. Load access masks corresponding to a particular fill can be cleared as its record is retired from the execution log 56, as all subsequent load instructions would have retrieved a fill at least as current.

Figure 3:
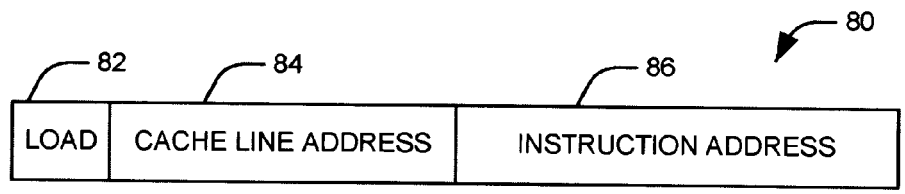
FIG. 3 illustrates an example of an execution log entry.

FIG. 3 illustrates an example of an execution log entry 80 representing a load instruction executed by an associated processor. An instruction type field 82 indicates the type of the recorded instruction (e.g., store, load, fill record, etc.). In some implementations of the invention, the log can be used to record store instructions as well as load instructions, such that the instruction type field is useful in distinguishing between them. An address field 84 gives the memory address of the cache line accessed by the load instruction. An instruction PC field 86 gives the memory address of the load instruction itself. Other fields can be implemented in addition to those listed, and it will be appreciated that entries of other types (e.g., store instructions, fill records) can include other entries not illustrated herein.

Figure 4:
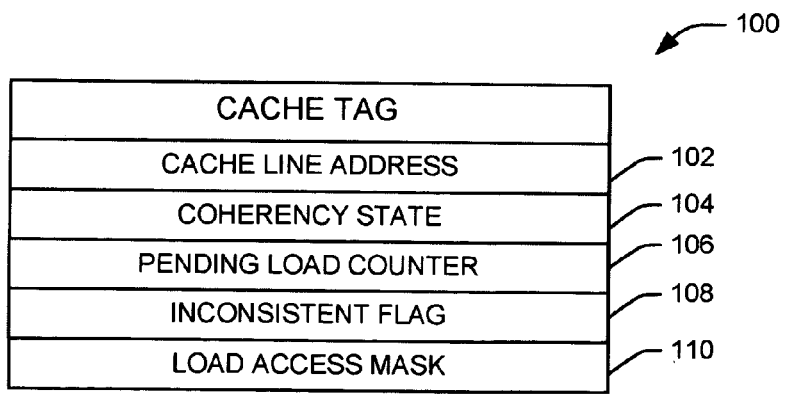
FIG. 4 illustrates one example of a cache tag entry.

FIG. 4 illustrates one implementation of a cache line tag 100 that can be used to support the speculative execution of load instructions. The cache line tag 100 includes an address field 102 that identifies the memory address of its associated cache line. A coherency state field 104 indicates the coherency state of the cache line. The contents of the coherency field are defined by the cache architecture and the cache coherency protocol of the system. A pending load counter field 106 tracks the number of outstanding load entries in the log. The pending load counter field 106 is incremented when a load entry corresponding to the cache line is added to the log and decremented when a load entry corresponding to the cache line is retired. The cache tag can also include an inconsistent flag 108 that can be set to indicate that the load instruction was executed in violation of the memory consistency model of the system. The inconsistent flag 108 can indicate that data retrieved as part of the execution of the load instruction has been changed prior to the retirement of the load instruction.

A load access mask field 110 indicates one or more portions, or quanta, of the data within the cache line that are read in executing the load instruction. Each bit of the load access mask field 110 represents one quantum of the cache line data, indicating whether that quantum of data was part of the load instruction. For example, in a sixty-four byte cache line, a quantum size of eight bytes can be used. The load access mask field 110 can comprise an eight-bit vector, with each bit representing one of the quanta. The load access mask field 110 can be used to determine if a cache line that is invalidated prior to the retirement of an associated load instruction is a source of inconsistency in the system. The cache line is compared to an updated fill to determine inconsistency, but only along portions indicated as significant to the load instruction by the load access mask field 110.

Figure 5:
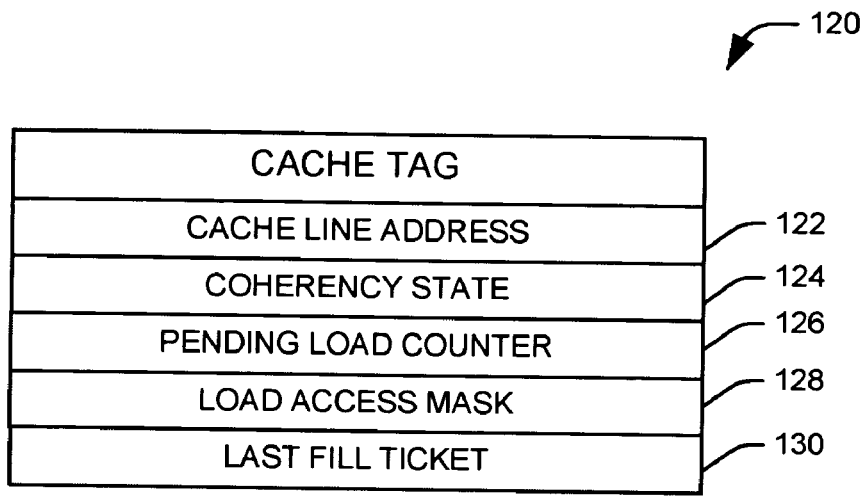
FIG. 5 illustrates another example of a cache tag entry.

FIG. 5 illustrates another implementation of a cache line tag 120 that can be used to support the speculative execution of load instructions. The cache line tag 120 includes an address field 122 that identifies the memory address of its associated cache line. A coherency state field 124 indicates the coherency state of the cache line. The contents of the coherency field are defined by the cache architecture and the cache coherency protocol of the system. A pending load counter field 126 tracks the number of outstanding load entries in the log. The pending load counter field 126 is incremented when a load entry corresponding to the cache line is added to the log and decremented when a load entry corresponding to the cache line is retired.

The cache tag 120 also includes a load access mask field 128 that records updates to the cache line data after it has been retrieved by a load instruction. Each bit of the load access mask field 128 represents one quantum of the cache line data, indicating whether that quantum of data has been altered since the execution of the load instruction. For example, in a sixty-four byte cache line, a quantum size of eight bytes can be used. The load access mask field 128 can comprise an eight-bit vector, with each bit representing one of the quanta. When the load instruction is a candidate for retirement, the load access mask field can be evaluated to determine if any of the cache line data retrieved by the instruction has been altered.

The load access mask field 128 can be updated each time the cache line is invalidated by another processor within the system. Each time an updated fill is received, the load access mask field is updated with any new changes and a last fill ticket field 130 is incremented. The last field ticket 130 can be used to label and record fills within an execution log associated with the system. Fills and load instructions within the execution log can be ordered such that all load instructions executed with one copy of the fill will be retired before the entry corresponding to the subsequent fill is retired. When a fill having a label matching the last fill ticket field is retired, it indicates that no further fill entries associated with the cache line are recorded in the log. Accordingly, all subsequent load instructions to the cache line have used the most recent version of the cache line. Since there is no longer any difference between the updated cache line and the cache line used in executing the various load instructions, the load access mask is cleared upon the retirement of a fill entry with a ticket number matching the last fill ticket field.

Figure 6:
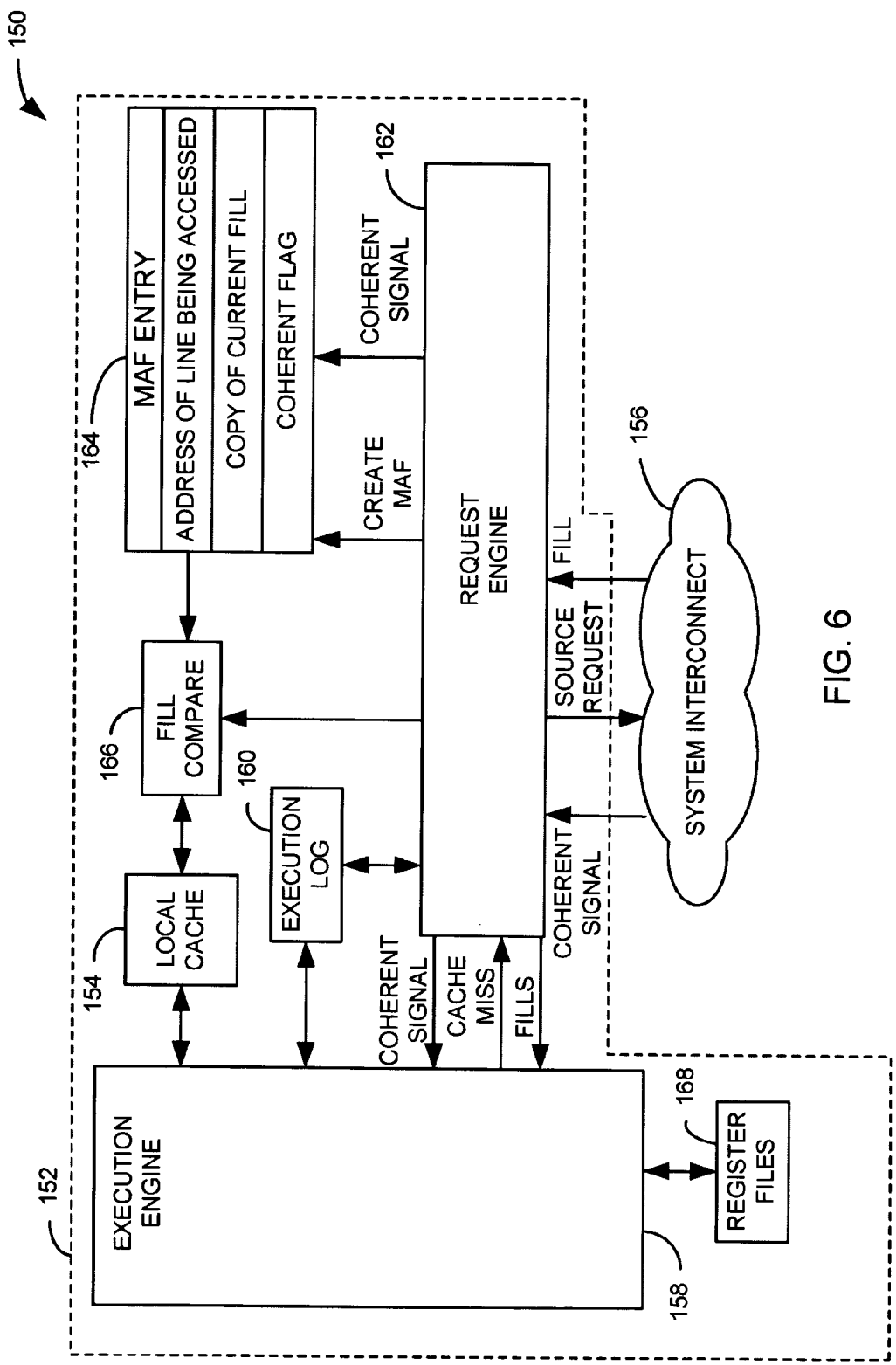
FIG. 6 depicts an example of a processor system.

FIG. 6 depicts an example of a system 150 that can employ speculative execution of load instructions to reduce processor latency. The system 150 implements a cache coherency protocol to manage the sharing of memory blocks so as to guarantee coherence of data. The cache coherency protocol of the system 150 utilizes a plurality of states to identify the state of each memory block stored in one or more memory structures (e.g., main memory, processor caches) associated with the system 150. The coherency protocol establishes rules for transitioning between states.

As used herein, a processor 152 that issues a source request, such as a read or write request, defines a source processor. Other nodes (not shown) within the system 150 are potential targets of the request. For example, when a source processor 152 requires a copy of a given memory block to execute a load instruction, it typically first requests the memory block from its local private cache 154 by identifying the address associated with the memory block. If the data is found locally, the memory access is resolved without communication via the system interconnect 156. The data is provided to an execution engine 158 from the cache and an entry is written to an execution log 160 associated with the processor 152.

Where the requested memory block is not found locally, a request engine 162 associated with the processor 152 can request the memory block from other nodes within the system 150. In addition to the request identifying an address associated with the requested memory block, the request usually identifies the type of request or command being issued by the requester. The system 152 responds to the request with one or more data fills associated with the memory block in accordance with the cache coherency protocol of the system 150. A data fill is a copy of the memory block associated with a requested cache line. The data fill can be a speculative fill. A speculative fill is a data fill that may or may not be the latest version of the memory block. Speculative fills can be provided by a local cache, a local processor (e.g., within a multiprocessor group), a remote processor, a home node or a speculative guess structure. The speculative guess structure can be implemented by employing a speculative table, speculative engine or separate cache structure that maintains speculative copies of memory blocks.

A speculative fill allows the requesting processor to execute several thousands of program instructions ahead prior to receiving a coherent copy (e.g., a copy of the cache line known to be current under the cache coherency protocol of the system) of the requested cache line. To maximize the benefit of the speculative fill, the processor can execute instructions beyond a memory barrier associated with the original load instruction. When the speculative fill is provided to the execution engine 158, the fill is recorded in a missed address file (MAF) entry 164 associated with the cache line. The speculative fill is written into the local cache 154 with a tag indicating its address, its coherency state, and the outstanding load instruction to the cache.

The execution engine 158 continues to execute load instructions, and may execute beyond one or more memory barriers prior to retiring the speculatively fill load instruction. Eventually, a coherent fill of the cache line is provided to the processor 152 along with a coherent signal that indicated that the coherent fill is the most recent version of the cache line. Once the coherent signal is received, the source processor can compare the coherent data fill to the speculative data fill at a load compare component 166.

If the coherent data fill is identical to the speculative fill, the processor can continue execution, thus mitigating latency caused by the processor remaining in an idle state until a coherent version of the requested memory block is received. If it is determined that coherent data fill is different from the speculative data fill, the execution engine 158 can back up and re-execute program instructions with the coherent fill of the cache line. The source processor then backs up and begins executing again with the new data, but loses little or no time from the execution of the speculative fill as the source would have remained latent during the retrieval of the coherent copy regardless. The cache coherency protocol can continue executing after the coherent copy is retrieved to change states of one or more copies of the memory block in the system if necessitated by the source request.

It will be appreciated that the cache line can still be invalidated by another processor between the time the coherent fill is received and the time at which the load instruction is retired. In this case, another coherent fill of the data is obtained from the system to update the cache line. The load compare component 166 compares the two data fills, and a load access mask is written within the tag portion of the cache line to indicate any changed values. The load access mask can be implemented as a vector of bits, with each bit representing a quantum of the cache line fill data. If any values within a given quantum have changed, then the corresponding bit in the load access mask is set.

After the load access mask is written to the cache line tag, a last fill ticket field within the cache tag is incremented to indicate that an updated fill has been provided to the cache line. An entry representing the fill is added to the execution log 160, labeled with the value of the incremented last fill ticket. Fill entries are maintained in order with load instructions, such that a given fill will not be retired until all load instructions using the previous fill have been retired. Additional fills can be received if the cache line is invalidated before retirement. As they are received, the load access mask is updated, the last fill ticket field in the cache line is incremented to reflect the new fill, and the new fill is also recorded in the execution log, with a ticket number reflecting the new last fill ticket field number.

Instructions recorded within the execution log 160 are retired in an appropriate order. In the illustrated system 150, the execution log 160 acts as a first-in-first-out queue, with each queue entry representing a load instruction. As each entry reaches the top of the queue, its associated load instruction becomes a candidate for retirement. When a load instruction to an invalidated cache line reaches the top of the queue, the system determines which quanta of the cache line data were retrieved by the load instruction. The load access mask is examined to determine if any of retrieved quanta were modified by an updated fill. If it is determined that the pertinent portion of the cache line has been modified, the execution engine 158 can back up and re-execute program instructions from the invalidated fill on with the most recent fill of the cache line. Otherwise, the processor can continue execution, thus mitigating latency resulting from stopping execution at the memory barrier.

Information associated with each instruction is retained in the event of a processor backup. For example, the processor 152 can include a cache system 154 that can be set to a cache state and a register file system 168 that can be set to a register file state associated with a processor backup state in the event of a violation of the system coherency protocols or consistency model caused by the speculative fill. A pointer or index can be retained that points to a location in the cache system or a log that retains information associated with the cache state corresponding to the state of the cache at a processor backup state. Additionally, a pointer or index can be retained that points to a location in the register file system that retains information associated with the register file corresponding with the state of the register file at a processor backup state. If the processor employs an out-of-order pipeline, the register rename map that points to the backed up locations of the register file is operative to be reset during a processor backup.

As entries reflecting the updated fills arrive at the end of the execution log 160, they are retired. If a retired fill associated with a cache line has a ticket value that matches the last fill ticket in the cache tag, then there are no additional fills to the cache line stored in the execution log 160. Accordingly, any subsequent load instructions would have used the current copy of the fill. The load access mask within the cache tag is cleared to reflect the retirement of a fill having a ticket number matching the last fill ticket field.

Figure 9:
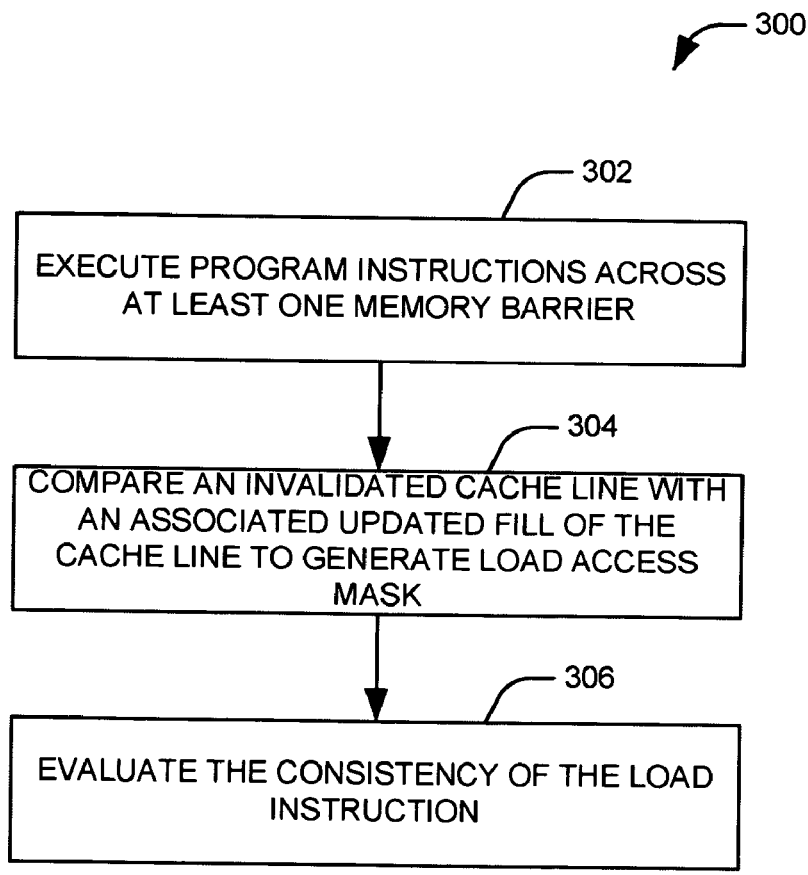
FIG. 9 illustrates a methodology for authenticating a load instruction associated with an invalidated cache line.
Figure 7:
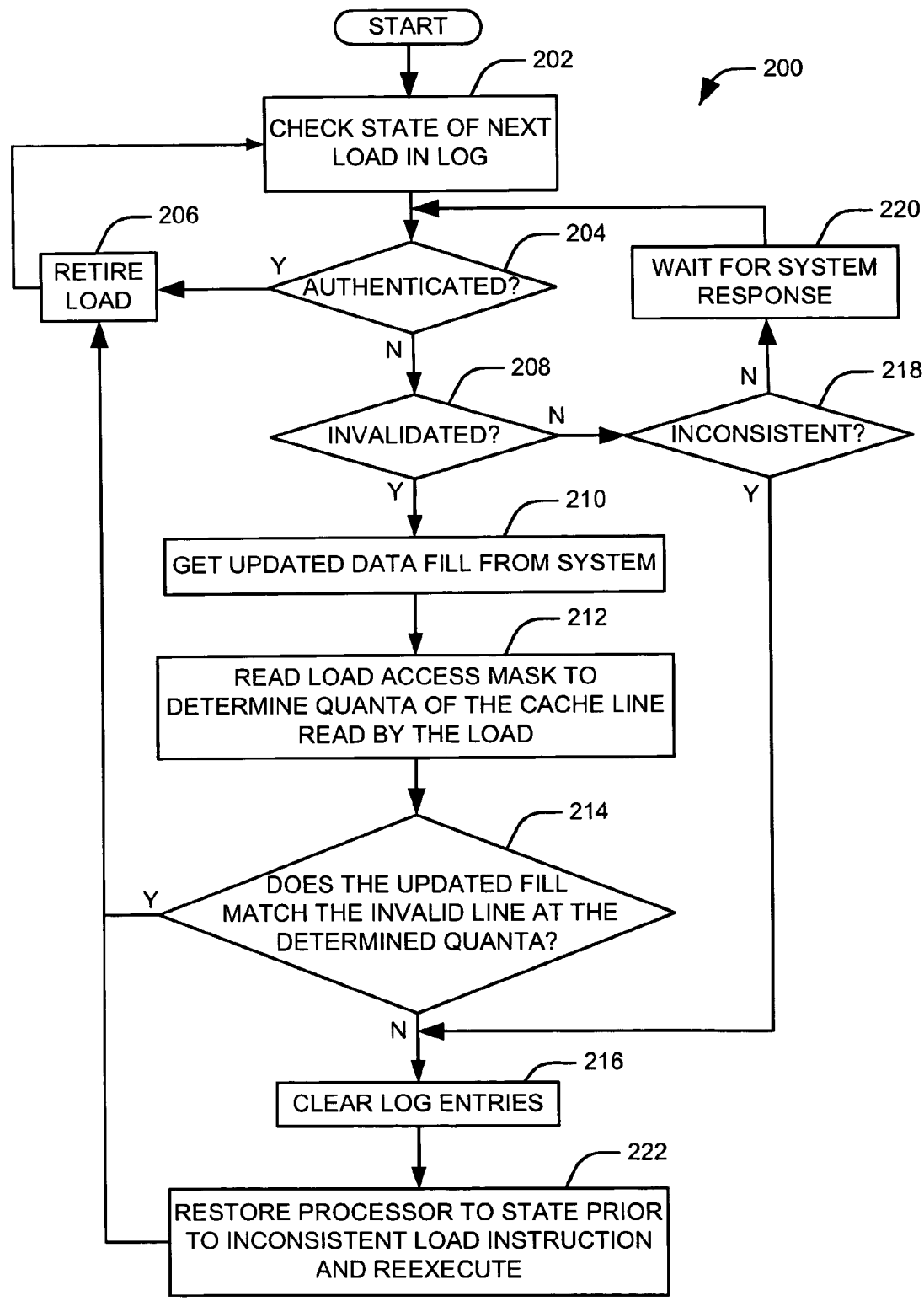
FIG. 7 illustrates a methodology for maintaining system consistency in a multiprocessor system.
Figure 8:
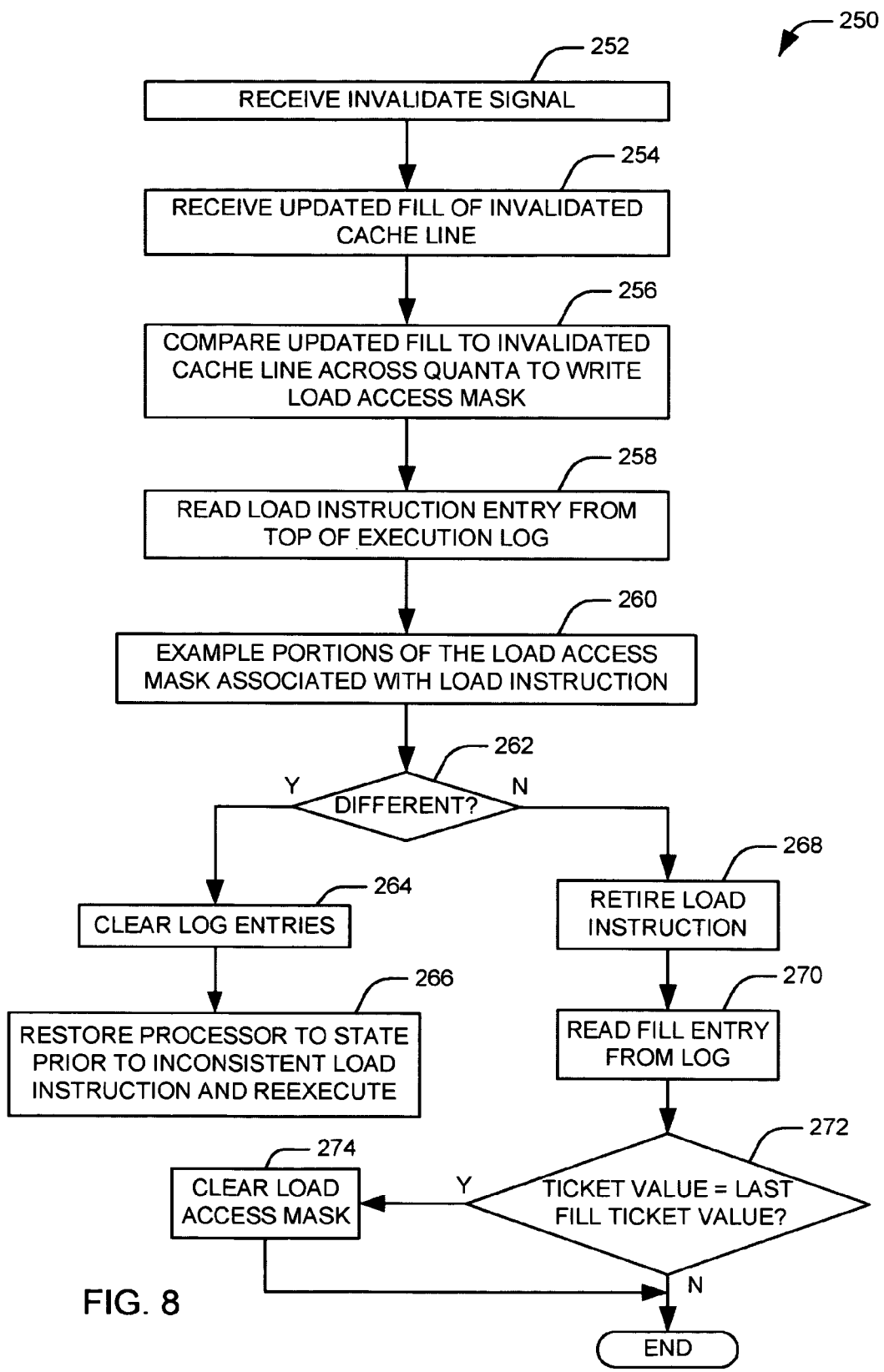
FIG. 8 illustrates a methodology for authenticating an invalidated load instruction.

In view of the foregoing structural and functional features described above, certain methods will be better appreciated with reference to FIGS. 7-9. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 7 illustrates a methodology for maintaining system consistency in a multiprocessor system. At 202, a next entry within an execution log is checked to determine if a load instruction associated with the entry can be retired. For example, a missed address file (MAF) and the tag portion of a cache line associated with the load instruction can be read to determine the status of the file. At 204, it is determined if the load instruction is in an authenticated state. For example, a load instruction can be in an authenticated state if the cache line data retrieved by the load instruction has not been invalidated by the system. If the load instruction is in an authenticated state (Y), the methodology proceeds to 206, where the load instruction is retired. When the load instruction is retired, its associated entry is removed from the log and information relating to the load instruction can be cleared from a tag portion of the cache line associated with the load instruction. The methodology then returns to 202 to review the next entry within the log.

If the load instruction is not in an authenticated state (N), the methodology proceeds to 208. At 208, it is determined if the load instruction is in an invalidated state. For example, a load instruction can be in an invalidated state if another processor within the system invalidates the cache line retrieved by the load instruction before the load instruction can be retired. If the load instruction is in an invalidated state (Y), the methodology continues to 210, where an updated fill of the cache line is retrieved from the system. A read access mask associated with the cache line is then read at 212 to determine which portions, or quanta, of the cache line data were retrieved by the load instruction. The read access mask is written at the time of the load and can be stored in the cache line tag.

The updated data fill is compared to the invalidated cache line at the quanta of the cache line retrieved by the load instruction at 214. If the updated data fill matches the invalidated cache line at the retrieved quanta (Y), the data retrieved by the cache line has not been changed. The load instruction is then considered to be authenticated, and the methodology proceeds to 206 where the load instruction is retired. If the updated data fill and the invalidated cache line do not match at the retrieved quanta (N), the load instruction is inconsistent and it is necessary to back up the system to the instruction that retrieved the inconsistent data. The methodology then proceeds to 216.

Returning to the decision at 208, if the load instruction is determined not to be invalid (N), the methodology continues to 218. At 218, it is determined if the load instruction is inconsistent. This can be determined by reading an inconsistent flag located in the cache tag of a cache line retrieved by the load instruction. If the load instruction is not in an inconsistent state (N), then it is likely in a pending state, where one or more responses from the system are required to evaluate the consistency of the load instruction. The methodology then advances to 220 to wait for the necessary system response. The methodology then returns to 204 to reevaluate the load instruction.

If the load instruction is in an inconsistent state (Y), the methodology advances to 216, where the entries within the log are cleared. The methodology then continues to 222, where the processor is restored to its state prior to the inconsistent load instruction and the load instruction and all subsequent instructions are re-executed. Once the load instruction has been properly executed, the load instruction is once again added to the log. When the load instruction returns to the top of the log, the load instruction can be retired at 206.

FIG. 8 illustrates a methodology 250 for authenticating an invalidated load instruction. An invalidate signal is received at a cache line having one or more associated outstanding load instructions at 252. The invalidate signal indicates that a more recent version of the cache line has been written by another processor within the system. At 254, an updated fill of the cache line is retrieved from the system. This can be accomplished via the system cache coherency protocol. A record of the updated fill is added to an execution log associated with the system with a ticket value. A last fill ticket value associated with the cache line tag is incremented to reflect the new fill.

At 256, the updated fill of the cache line is compared to the invalidated cache line. Any differences between the two versions of the cache line can be reflected in a load access mask. The comparison can be performed across portions of the data, with each portion being represented as one bit in a load access mask. The load access mask, for example, can record a logic high for any bit whose associated portion of the cache line has been altered and a logic low for any unaltered portions of the cache line. The load access mask is written to the cache tag.

At 258, an entry corresponding to the load instruction reaches the top of an execution log used to record instructions executed by the processor. The entry includes a record of which portions of the cache line were retrieved by the load instruction. At 260, the portions of the cache line retrieved by the load instruction are examined within the load access mask to determine if the retrieved portions have been altered. At 262, it is determined if the retrieved portions are indicated to have changed according to the load access mask. If one or more of the retrieved portions have been altered (Y), the methodology advances to 264, where the entries within the log are cleared. The methodology then continues to 266, where the processor is restored to its state prior to the inconsistent load instruction and the load instruction and all subsequent instructions are re-executed. Once the load instruction has been properly executed, the load instruction is once again logged, and can be retired when it returns to the top of the log.

If none of the retrieved portions of the cache line have been altered (N), the methodology advances to 268, where the load instruction is retired. At 270, an entry corresponding to the fill reaches the top of the instruction log. At 272, the ticket value for the fill is compared to the last fill ticket number in the cache line tag. If the values match (Y), the load access mask is cleared at 274 and the methodology terminates. If the values do not match (N), the process terminates.

FIG. 9 illustrates a methodology 300 for authenticating a load instruction associated with an invalidated cache line. At 302, program instructions are executed across at least one memory barrier. At 304, an invalidated cache line is compared with an updated fill of the cache line corresponding to a load instruction to generate a load access mask. At 306, the consistency of a load instruction associated with the invalidated cache line is evaluated based on the portion of the cache line retrieved by the load instruction and the load access mask.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-processor system that conforms to a cache coherency protocol, the system comprising:
a processor that executes program instructions beyond at least one memory barrier of at least one executed load instruction;
a request engine that retrieves an updated data fill with an undetermined coherency state from one or more other processors of the multi-processor system via a prosessor-to-processor data fill, the updated data fill corresponding to an invalid cache line from which data had been retrieved by the at least one executed load instruction; and
a load compare component that compares the invalid cache line to the updated data fill to evaluate the consistency of the at least one executed load instruction prior to retiring the at least one executed load instruction.

2. The system of claim 1, wherein the system further comprises an execution log that records a plurality of entries corresponding to non-retired executed load instructions.

3. The system of claim 2, wherein the execution log acts as a first-in-first-out (FIFO) queue, and a load instruction is evaluated as a candidate for retirement when it is moved to the top of the queue.

4. The system of claim 1, wherein the load compare component writes a load access mask that indicates which of a plurality of quanta comprising the invalid cache line are different from the updated data fill.

5. The system of claim 4, wherein the system further comprises an execution log that employs the load access mask to determine the consistency state of a load instruction associated with a cache line.

6. The system of claim 5, wherein the system further comprises a last fill ticket number that increments each time an updated fill is provided associated with the invalid cache line.

7. The system of claim 6, wherein the execution log stores entries corresponding to updated fills of the invalid cache line received by the system, and a given entry contains a ticket number equal to the last fill ticket number at the time the entry is recorded.

8. The system of claim 7, wherein the load access mask is cleared when an entry having a ticket number equal to a current value of the last fill ticket number is retired from the execution log.

9. The system of claim 1, wherein the system further comprises a pending load counter that increments when a load instruction associated with the cache line executes and decrements when a load instruction associated with the cache line is retired.

10. The system of claim 9, wherein the invalid cache line is retained within a cache as a resident invalid cache line when the pending load counter is equal to a non-zero value.

11. The system of claim 10, wherein the invalid cache line is released to be overwritten when the pending load counter is equal to zero.

12. The system of claim 1, wherein the system further comprises a load access mask that indicates which of a plurality of quanta comprising the invalid cache line were retrieved when a given load instruction was executed.

13. The system of claim 12, wherein the load compare component compares the invalid cache line to the updated data fill only for the quanta indicated by the load access mask.

14. The system of claim 1, wherein the request engine generates a miss address file (MAF) entry associated with a request for a data fill, the MAF entry having a plurality of fields that retain information relating to the request.

15. The system of claim 1, wherein the system requests a data fill from the system through the request engine in response to a cache miss, and the system responds with a plurality of data fills.

16. The system of claim 15, wherein at least one of the data fills is a speculative data fill, and the system processes the speculative data fill until a coherent data fill is received from the system.

17. The system of claim 15, wherein the processor receives a coherent signal generated by the multi-processor system that provides an indication of which of the plurality of data fills received by the processor is the coherent data fill.

18. A processor in a multi-processor system that conforms to a cache coherency protocol, the processor evaluating the consistency of a load instruction in a program executed beyond at least one memory barrier of the load instruction, the processor comprising:
 a request engine that retrieves an updated data fill with an undetermined coherency state from one or more of the other processors of the multi-processor system via a processor-to-processor data fill, the update data fill corresponding to an invalid cache line from which data had been retrieved by the load instruction;
 a load compare component that compares the invalid cache line to the updated data fill; and
 a load access mask that operates in conjunction with the load compare component to evaluate the consistency of the load instruction.

19. The system of claim 18, wherein the load access mask indicates which of a plurality of quanta comprising the invalid cache line are different from the updated data fill.

20. The system of claim 19, wherein the load access mask comprises the output of the load compare component.

21. The system of claim 18, wherein the load access mask indicates which of a plurality of quanta comprising the invalid cache line were retrieved when a given load instruction was executed.

22. The system of claim 21, wherein the load compare component compares the invalid cache line to the updated data fill at quanta indicated by the load access mask.

23. A multi-processor system that conforms to a chache coherency protocol, the system evaluating the consistency of program execution beyond at least one memory barrier, the system comprising:
 means for executing program instructions beyond at least one memory barrier of an executed load instruction;
 means for retrieving an updated data fill with an undetermined coherency state directly from one or more other means for executing program instructions of the multi-processor system, the updated data fill being associated with an invalidated cache line from which data had been retrieved by the executed load instruction; and
 means for comparing the invalidated cache line to the updated data fill to evaluate the consistency of the executed load instruction prior to retiring the executed load instruction.

24. The system of claim 23, the system further comprising means for restoring the processor system to a previous state if the means for comparing indicates a difference between the invalidated cache line and the updated data fill.

25. The system of claim 23, the system further comprising means for logging a plurality of load instructions, such that the load instructions can be evaluated in a desired order.

26. The system of claim 23, the system further comprising means for limiting the means for comparing such that only portions of the invalidated cache line relevant to the load instruction are compared to the updated data fill.

27. The system of claim 23, the system further comprising means for recording the output of the means for comparing.

28. A method of program execution in a multi-processor system that conforms to a cache coherency protocol, the method comprising:
 executing program instructions beyond at least one memory barrier of a load instruction;
 comparing an invalidated cache line with an associated updated fill of the cache line from which data had been retrieved by the load instruction to generate a load access mask, the updated data fill having an undetermined coherency state and being received from one or more other processors of the multi-processor system via a processor-to-processor data fill; and
 determining the consistency of the load instruction associated with the invalidated cache line based on a portion of the cache line associated with the load instruction and the load access mask prior to retiring the load instruction.

29. The method of claim 28, wherein determining the consistency of a load instruction comprises dividing the invalidated cache line into a plurality of portions and determining which of the plurality of portions are associated with the load instruction.

30. The method of claim 29, wherein comparing the cache line to the updated fill includes comparing the cache line to the updated fill only for the portions of the cache line associated with the load instruction.

31. The method of claim 28, wherein the method further comprises dividing the invalidated cache line into a plurality of portions and recording which of the plurality of portions are different between the invalidated cache line and the updated data fill.

32. The method of claim 28, wherein the method further comprises backing up the processor and re-executing a plurality of instructions if the load instruction is determined to be inconsistent.

33. The method of claim 28, further comprising recording the load instruction in a queue as to control the timing of the determination of the consistency of the load instruction.

34. The system of claim 17, wherein:
 the invalid cache line comprises a plurality of quanta;
 the load compare component is configured to write a load access mask that indicates members of a proper subset of the plurality of quanta that is retrieved when a given load instruction was executed, the load compare component is configured to compare the invalid cache line to the coherent data fill only for members of the proper subset indicated by the load access mask; and
 the processor is configured to retire the given load instruction if each of the members of the proper subset of the plurality of quanta are determined to be coherent.

35. The system of claim 1, wherein the processor returns to a previous state and re-executes a plurality of load instructions, including at least one load instruction associated with the cache line, if the updated data fill is different from the invalid cache line.

36. The method of claim 28, wherein:
 determining the consistency of a load instruction comprises dividing the invalidated cache line into a plurality of portions and determining members of a proper subset of the plurality of portions of the invalid cache line that are associated with the load instruction; and comparing the invalidated cache line to the associated updated fill includes comparing only the members of the proper subset of the plurality of portions of the invalid cache line.

* * * * *

UNITED STATES PATENT AND TRADEMARK OFFICE
CERTIFICATE OF CORRECTION

PATENT NO. : 8,301,844 B2
APPLICATION NO. : 10/756534
DATED : October 30, 2012
INVENTOR(S) : Simon C. Steely, Jr. et al.

It is certified that error appears in the above-identified patent and that said Letters Patent is hereby corrected as shown below:

In the Specifications:

In column 4, line 9, delete "bathers" and insert -- barriers --, therefor.

In column 9, line 45, delete "The system 1 50" and insert -- The system 150 --, therefor.

In the Claims:

In column 14, lines 9-10, in Claim 1, delete "prosessor" and insert -- processor --, therefor.

In column 15, line 20, in Claim 18, delete "update" and insert -- updated --, therefor.

In column 15, line 39, in Claim 23, delete "chache" and insert -- cache --, therefor.

Signed and Sealed this
Fourteenth Day of May, 2013

Teresa Stanek Rea
*Acting Director of the United States Patent and Trademark Office*